Feb. 26, 1957

J. B. BEECROFT 2,782,603

POWER CONTROL SYSTEM

Filed Sept. 3, 1953

INVENTOR
JULIAN B. BEECROFT

ATTY.

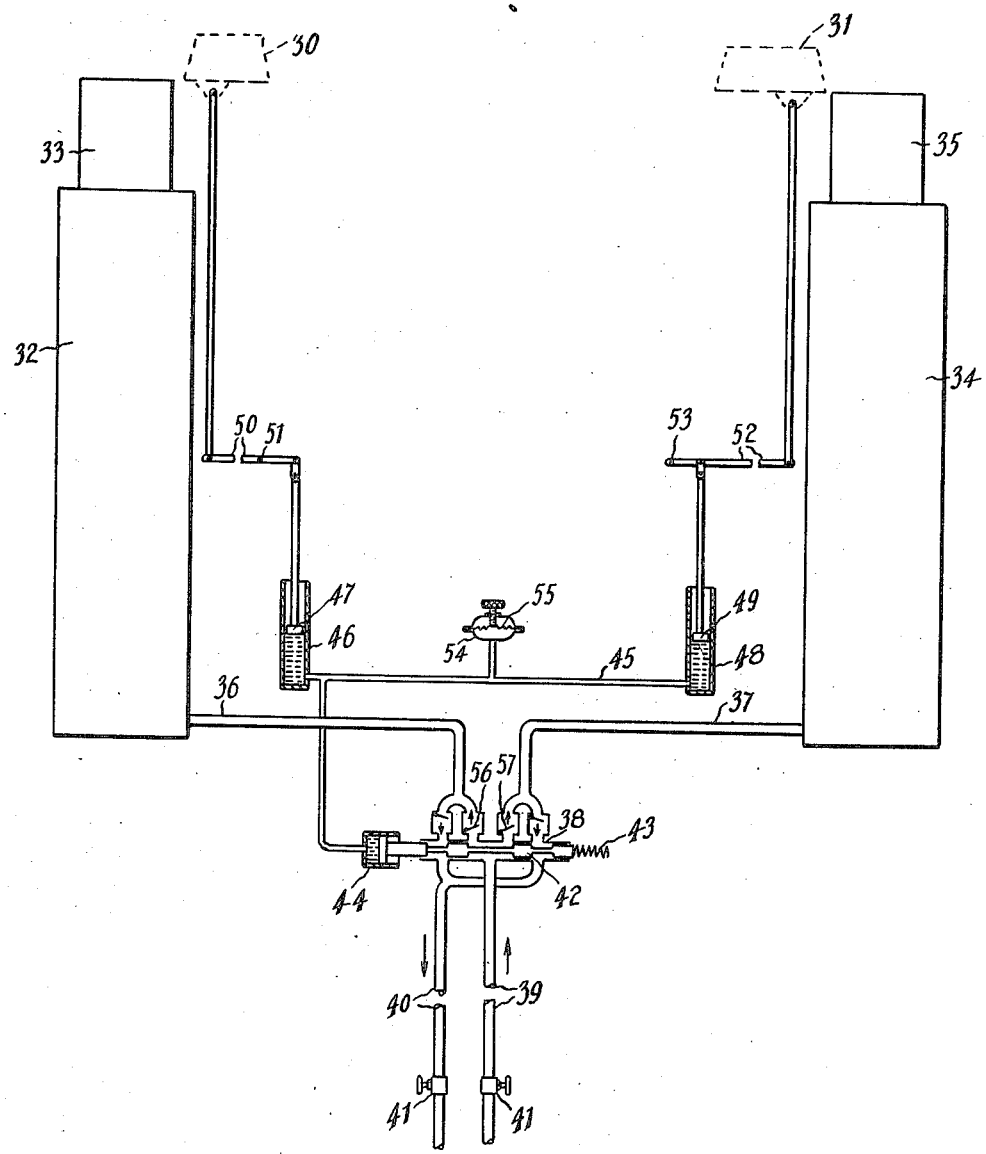

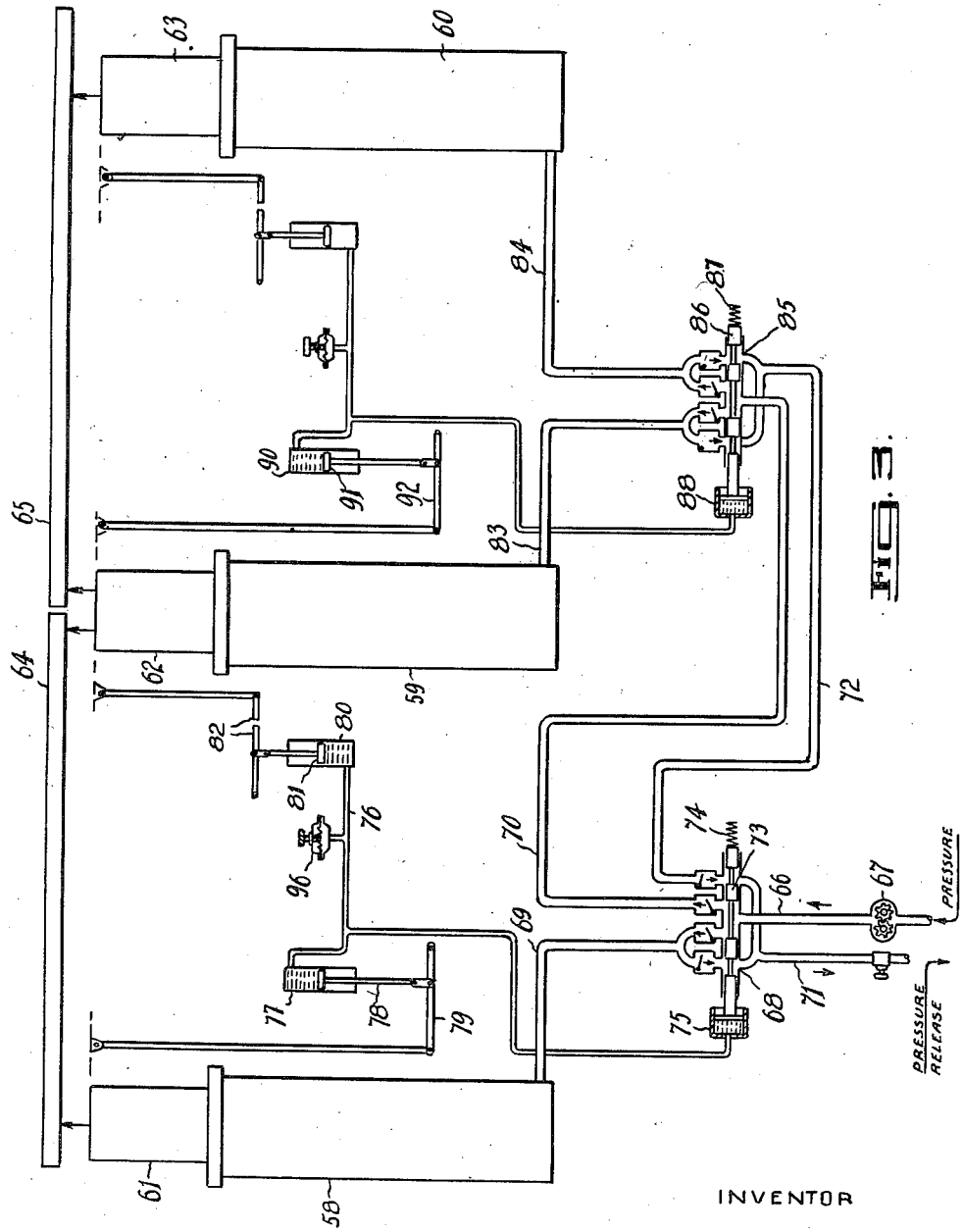

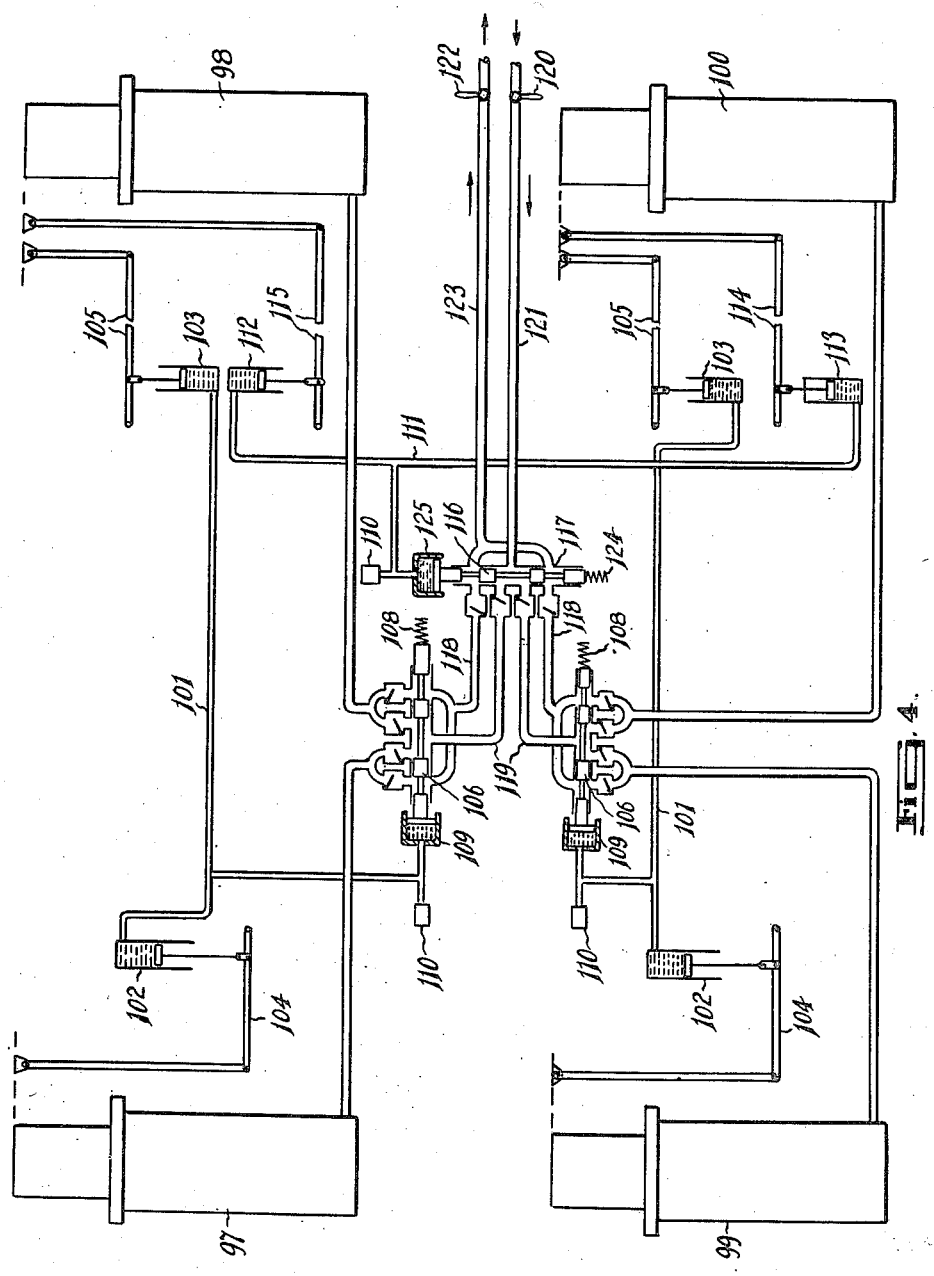

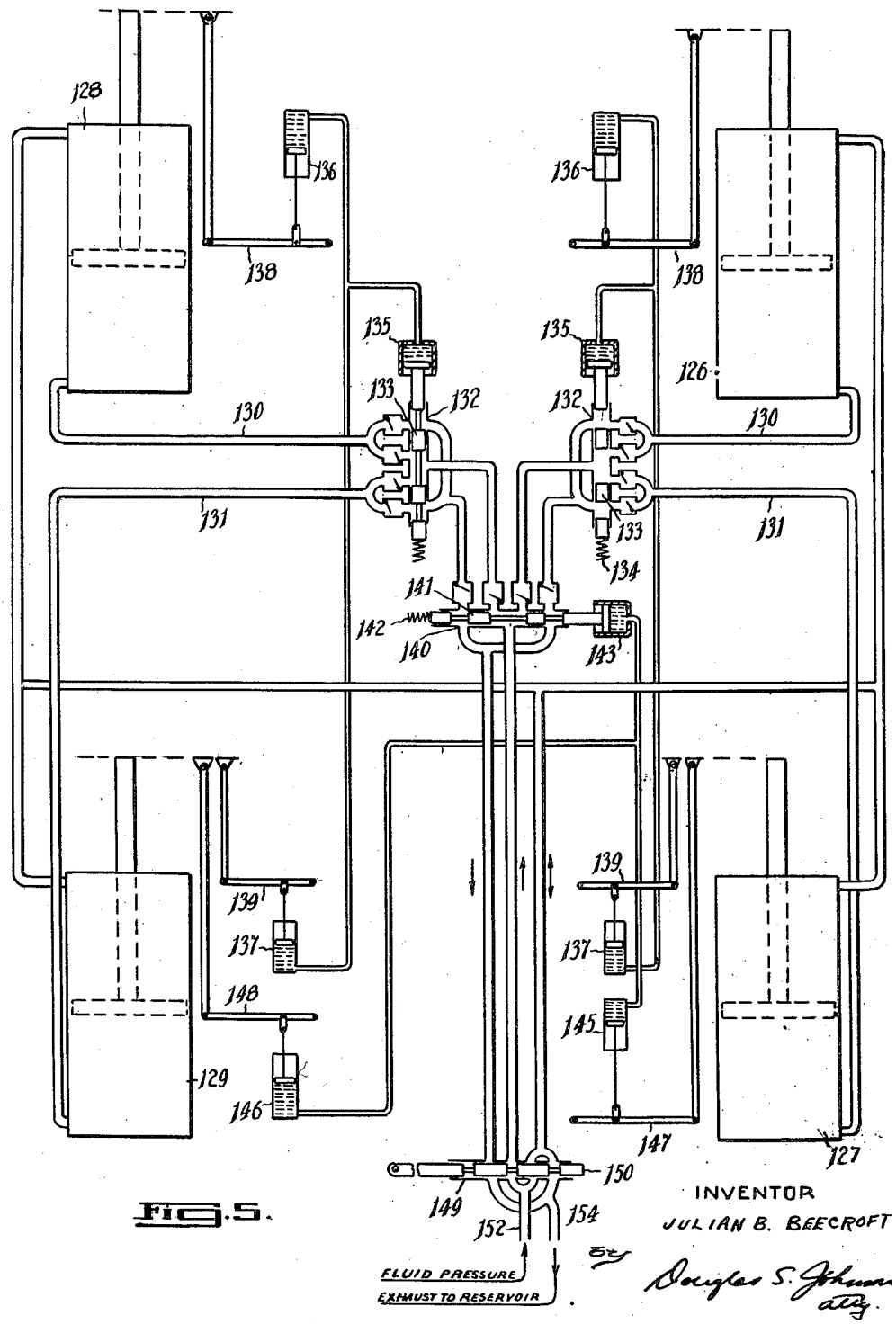

United States Patent Office 2,782,603
Patented Feb. 26, 1957

2,782,603

POWER CONTROL SYSTEM

Julian B. Beecroft, Whitby, Ontario, Canada

Application September 3, 1953, Serial No. 378,393

10 Claims. (Cl. 60—97)

This invention relates to means for maintaining moving members at least one of which is power operated in desired correlated positions throughout their range of movement.

The invention particularly relates to the controlling of a hydraulically operated member to follow a predetermined movement related to the movement of another or controlling member.

In many hydraulically operated systems employing two or more hydraulic units, each including a cylinder and operating piston, it is frequently desired that the pistons (or cylinders) move in synchronism e. g. to maintain a hydraulic lift level. Again it may be desired to correlate the piston movements so that one moves at a predetermined different rate from the other as for instance in hydraulic dumping equipment. Alternatively, it may be desired to move the piston of a single hydraulic unit a predetermined accurately defined distance upon predetermined movement of a control member.

Hydraulic synchronizing systems have previously been proposed for specific applications but none of these have been accurate or flexible enough for any broad commercial application. Moreover, such previous systems have required complicated gearing and other expensive mechanical arrangements.

It is the object of this invention to provide a flexible control arrangement for power operated, particularly hydraulically operated, moving members, which arrangement will enable a pair of such power operated members to move in exact synchronism, or to move at different but accurately predetermined and correlated rates, or which will enable a power operated slave member to accurately follow the movements of a control member.

Another object of the invention is to provide a control arrangement as aforesaid which will be simple and economical for both installation and maintenance.

Still another important object is to provide a control arrangement which will enable any number of power or hydraulically operated members or devices to be synchronized or moved in predetermined varying relation.

According to the present invention the power operated member or device whose movement is to be correlated to the movement of another member or device is operated by a control, and this control in turn is actuated by a controlling device having a neutral position allowing the control to resolve to a present position. The controlling device in turn is operated by a device or system having in effect an extensible and retractible action and extending between the controlling device and the moving members which are to be correlated. When the movement of the latter varies from desired correlation, the controlling device is moved by such extensible and retractible device or system from its neutral position in a manner to restore the moving members to desired correlated positions.

As a particular application, the power operated member or device comprises a hydraulically operated member controlled by a valve and the controlling device is connected to operate the valve.

One particular form of extensible and retractible device which may be employed comprises a cable and wind-up drum arrangement as particularly disclosed in my corresponding United States application Serial No. 378,232.

According to the present application however, the extensible and retractible system comprises a hydraulic system having columns of hydraulic fluid following the movement of the correlated members and arranged to displace a hydraulically operated member forming the controlling device actuating the power control upon the members moving out of synchronized or correlated positions.

More particularly the hydraulic system comprises an auxiliary or control hydraulic unit comprising a cylinder and piston associated with each member whose movement is to be correlated and a biased hydraulic unit for operating the control or valve member, the hydraulic units being hydraulically interconnected to actuate the valve operating hydraulic unit to maintain the moving members in correlated position or to operate one member forming a slave to follow the movements of another or master member.

The auxiliary or control hydraulic units are connected in reverse so that as one cylinder empties the other fills, and the valve operating hydraulic unit which is biased to deliver its hydraulic fluid to the control cylinders is maintained inoperative. However upon a variation in the volume of fluid displaced by one control unit piston and the volume of fluid entering the cylinder of the other control unit under its piston displacement the hydraulic balance in the biased valve operating hydraulic unit is upset and the valve is actuated thereby in a direction to accommodate the variation in piston volume displacement in the control cylinders, that is in a direction to restore the moving members to synchronized relation.

Where one member is to be made to follow the movement of another member to provide sensitive valve operation and to eliminate any necessity for a cumbersome valve operating hydraulic unit, a pair of reservoirs containing biased or spring loaded pistons, one having a lesser bias and one having a greater bias than the bias of the valve operating hydraulic unit, are connected in the hydraulic circuit, the one to take up any excess fluid delivered into the circuit by movement of the master member and which cannot be assimilated by the valve controlling hydraulic unit, and the other to supply any fluid required upon the fluid in the valve controlling hydraulic unit being exhausted by movement of the master member.

A further feature of the invention resides in providing means for multiplying and/or dividing movement of one member e. g. the master member in providing the movement of another or slave member.

Still another feature resides in providing predetermined but variable movement between two movable members by providing control cylinders of different diameters.

A fuller understanding of the invention will be had from the following description taken in conjunction with the accompanying drawings in which:

Figure 2 is a part elevational part diagrammatic view illustrating the invention applied to synchronize the movement of two independent loads.

Figure 3 is a part elevational part diagrammatic view illustrating the invention applied to synchronize three single-acting-gravity-return-hydraulic units.

Figure 4 is a part elevational part diagrammatic view illustrating the invention applied to correlate or synchronize four single-acting-gravity-return-hydraulic units.

Figure 5 is a view generally similar to Figure 4, illustrating the invention applied to correlate the movement of four hydraulic units which are double-acting.

Figure 1:
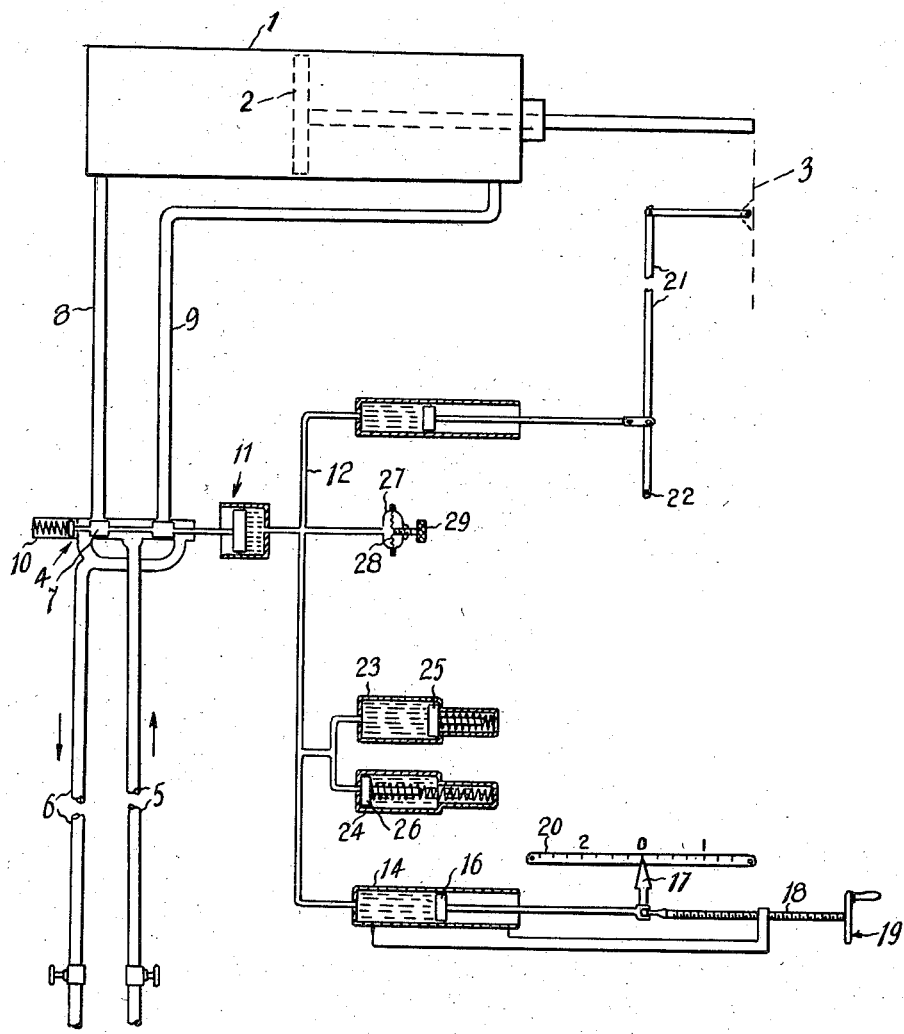
Figure 1 is a part elevational part diagrammatic view illustrating control means embodying the invention arranged to operate the moving member of a hydraulic unit to follow the movement of a control or master member.

With reference to Figure 1, the hydraulic unit to be controlled comprises a cylinder 1 in which operates a piston 2, the piston being connected to actuate a load which may take any form such as a platform, ram of a press etc., generally designated at 3. The hydraulic unit is shown as a double-acting unit connected through a four-way valve 4 to a pressure line 5 and a return 6. A slide valve member 7 regulates liquid flow to and from the cylinder 1 through the lines 8 and 9.

Biasing the slide valve member 7 to the right is a spring 10, while resisting movement of the valve member, is a dash-pot 11 connected in an auxiliary hydraulic circuit 12 which includes a pair of auxiliary or controlling hydraulic units comprising cylinders 13 and 14 in which operate pistons 15 and 16 respectively. The piston 16 is connected to a pointer 17 carried on a threaded spindle 18 operated by hand-wheel 19.

A scale 20 is provided to enable movement of the pointer 17 to be accurately gauged and this scale is calibrated in desired movement of the piston 2.

The piston 15 is connected to a lever 21 pivoted at 22 and this lever in turn is connected to the load 3 to be operated by movement of the piston 2.

Also connected in the hydraulic circuit 12 are a pair of follow-up reservoir devices comprising cylinders 23 and 24 in which operate the spring-loaded pistons 25 and 26 respectively. The bias on the piston 25 being less than the bias on the valve member 7 afforded by the spring 10 and the bias on the piston 26 being greater than the bias afforded by the spring 10.

A balancing unit 27 in the form of a closed chamber having a displaceable diaphragm 28 is connected in the auxiliary hydraulic circuit 12 and a control 29 is provided to position the diaphragm 28 as desired to adjust the amount of hydraulic liquid or fluid in the auxiliary hydraulic circuit.

The operaton of the device of Figure 1 is as follows:

When the control or master member in the form of the pointer 17 is actuated by the hand-wheel 19, say to the left, liquid is displaced out of cylinder 14 and until piston 15 has moved a sufficient distance to admit the volume of displaced liquid into cylinder 13, the displaced liquid creates an unbalance between the pressure of the liquid in the dash-pot 11 and the spring 10, moving the valve from the position shown to the left, admitting pressure liquid into the hydraulic line 8 connected with the cylinder 1. As the movement of the sliding valve member 7 to the left is limited by compression of spring 10 towards an ultimate position, any excess volume of liquid displaced out of cylinder 14 forces piston 26 of reservoir 24 to the right to accommodate this excess volume. Piston 26 will not however move to the right until after valve member 7 has been actuated to the left. Since piston 25 is at the extreme end of its stroke, it remain inoperative during the readjustment of the auxiliary hydraulic circuit to accommodate the displaced liquid from the cylinder 14.

As the hydraulic liquid or fluid enters the cylinder 1 through line 8, piston 2 and hence load 3, it is moved to the right and this motion as multiplied or divided by lever 21 depending upon the position of the pivot 22 is converted into movement of the piston 15 of the auxiliary or control circuit 12, moving this piston to the right. As this piston 15 moves to the right, additional liquid or fluid from the auxiliary hydraulic circuit is admitted and the reservoir 24 will first discharge its contents into cylinder 13 followed by action of the spring 10 to discharge liquid or fluid from the dash-pot 11 into cylinder 13 acting to move the slide valve member 7 to the right until this member has moved sufficiently to close lines 8 and 9 cutting off hydraulic flow to the cylinder 1 at which point load 3 and control piston 15 come to rest restoring the hydraulic auxiliary or control system to a balanced position with the load 3 displaced to the position dialed on the scale 20. Movement of the control or master member 17 in the opposite direction, that is to the right, reverses the action causing spring 10 to empty dash-pot 11 into the master control cylinder 14 connecting the hydraulic line 5 through the line 9 to the opposite end of cylinder 1. Any excess of liquid or fluid required to accommodate the displacement of the master control piston 16 is delivered from the reservoir 23 by its spring-loaded piston 25. The movement of the piston 2 and the load 3 will then be reversed, reversing the movement of the slave control piston 15 to displace the liquid or fluid from the slave control cylinder 13 into the auxiliary hydraulic circuit to first restore reservoir piston 25 to its position of Figure 1 and to then actuate the dash-pot 11 against the bias of the spring 10 to restore the slide valve member to its neutral position cutting off flow to the cylinder 1.

While the lever 21 forms a means of multiplying or dividing movement of the control or master member 17 such multiplication or division may be obtained by having the master and slave control cylinders 14 and 13 of different diameters so that the piston in one must move a greater or lesser distance to afford the same volume displacement as the piston in the other. Figure 1 is representative of such an arrangement where the diameters of cylinders 13 and 14 are varied.

The above description describes the invention applied to operate a slave member to follow a master member.

Figure 2 illustrates the invention applied to synchronize two separate loads. In this connection the separate loads 30 and 31 are actuated by hydraulic units comprising cylinder 32 and piston 33 and cylinder 34 and piston 35. The hydraulic lines 36 and 37 are connected through a valve 38 with a pressure line 39 and a return 40, each controlled by a suitable manual valve 41. The valve 38 includes a sliding valve member 42 normally held in the neutral position of Figure 2 by the opposing action of a biasing spring 43 and a dash-pot 44 with the pistons 33 and 35 in synchronized or correlated relation. In communication with the dash-pot 44 is an auxiliary or control hydraulic circuit 45 including a pair of control hydraulic units comprising cylinder 46, piston 47 and cylinder 48 and piston 49. A lever arrangement 50 operating about a pivot 51 is connected to load 30 to depress piston 47 with elevation of the load in a proportion determined by the setting of pivot 51.

A second lever arrangement 52 including a pivot 53 is arranged to elevate piston 49 for elevation of load 31. A balancing unit 54 including a displaceable piston or diaphragm 55 is included in the auxiliary or control hydraulic circuit 45.

In operation with the pressure line 39 open and the gravity-return line 40 closed and the slide valve member 42 in the position illustrated in Figure 2, liquid flow is divided evenly through the check valves 56, 57 between the lines 36, 37. Actuating pistons 33, 35 and hence loads 30 and 31 are in synchronized movement depressing control piston 47 precisely to the same degree as control piston 49 is elevated. The result is that liquid or fluid displaced from control cylinder 46 is exactly taken up by control cylinder 48 and the auxiliary control circuit 45 remains in balance leaving the slide valve member 42 in its central or neutral position.

A change in frictional forces or a difference in the loads 31 and 30 will however cause one piston to move at a rate differing from the other. Suppose piston 33 begins to drag behind piston 35, under this condition, control piston 49 will be elevated to a degree greater than the depression of control piston 47 disturbing the balance in the auxiliary hydraulic control circuit 45 and liquid or fluid will be bled from the dash-pot 44 to supply the necessary excess for control cylinder 48 beyond that supplied by the control cylinder 46. This unbalance will operate slide valve member 42 to the left reducing flow to line 37 thus reducing the rate of elevation of piston 35 to bring the pistons back into synchronized relation.

As the pistons again approach synchronized relation liquid or fluid from the cylinder 46 will be delivered to the dash-pot 44 to restore the balance of the auxiliary hydraulic circuit, moving slide valve member 42 to the right against the action of the spring 43 until again the flow is divided equally between hydraulic lines 36 and 37.

It will be understood that the situation will just be reversed upon load 31 dragging and similarly with pressure line 39 closed by valve 41 and return line 40 opened, the auxiliary hydraulic control circuit will operate just in reverse to that above described to synchronize the pistons 33 and 35 throughout their descent.

Figure 3 illustrates the application of the invention to controlling three hydraulic units, comprising cylinders 58, 59 and 60, and their operating pistons 61, 62 and 63 respectively. For simplicity the hydraulic units are shown as operating in synchronism to elevate platform 64 and 65 and the hydraulic units there shown as single-acting-gravity-return hydraulic units. In this arrangement, pressure flow in a pressure line 66 created by any suitable means such as gear pump 67, is divided by a valve 68 having appropriate valving openings in the ratio of one to two between the lines 69 feeding hydraulic unit 58 and 70 feeding the paired units 59 and 60. The gravity-return line 71 is also connected through the valve 68 to divide return flow from line 69 and line 72 carrying the return from cylinder 58 and paired cylinders 59 and 60 respectively in the ratio of one to two, that is the areas of the valve openings of valve 68 provide this division of flow with the sliding valve member 73 in the neutral position shown in Figure 3 with the cylinders in synchronized relation.

Maintaining the valve member 73 in this neutral position with the cylinders synchronized is a biasing spring 74 and an opposing dash-pot 75 connected in an auxiliary hydraulic control circuit 76 including the auxiliary hydraulic control unit comprising cylinder 77 and piston 78 connected to the movement of main piston 61 by lever arrangement 79 and the auxiliary hydraulic control unit comprising cylinder 80 and piston 81 connected to the movement of main piston 62 by lever arrangement 82.

The lever arrangements 79 and 82 are arranged to operate the control pistons 78 and 81 respectively in opposite directions with relation to their respective cylinders 77 and 80 for similar direction of movement of the main pistons 61 and 62.

The hydraulic flow in line 70 is in turn equally divided with pistons 62 and 63 in synchronized relation between the lines 83 and 84 connected respectively to their cylinders by valve 85 which is identical with valve 38 of Figure 2. This equal division of flow between lines 83 and 84 is obtained with the sliding valve member 86 in the central or neutral position of Figure 3 held under the balancing action of spring 87 and hydraulic control unit or dash-pot 88 connected in the auxiliary hydraulic control circuit 89. Circuit 89 also includes the auxiliary or control hydraulic units comprising cylinder 90, piston 91 connected by lever arrangement 92 to the movement of piston 62 and cylinder 93 and piston 94 connected by lever arrangement 95 with piston 63.

Both the auxiliary control circuits 76 and 89 incorporate suitable balancing devices 96.

Under action of pistons raising platform 64 and 65, the system will operate to split hydraulic flow in the ratio of one to two between lines 69 and 70 and the flow from line 70 equally between lines 83 and 84 with the pistons 61, 62 and 63 moving in step or synchronized relation. Any unbalance between pistons 62 and 63 will be compensated for by the action of the auxiliary hydraulic control circuit 89 operating slide valve member 86 in exactly the same manner as described in connection with the balancing of the two hydraulic control units of Figure 2. Any unbalance between the combined balanced movement of pistons 62 and 63 and piston 61 will be controlled by auxiliary hydraulic control circuit 76 actuated under such unbalance in the same manner as described with reference to the set up of Figure 2 to regulate the division of flow between the lines 69 and 70 with the pistons raising to restore the piston 61 to synchronism with the paired pistons 62 and 63 and similarly to control the flow in the lines 69 and 72 with the pistons descending, to restore the piston 61 to synchronism with the paired balanced pistons 62 and 63.

Figure 4 illustrates the application of the invention to correlate or synchronize the movement of four hydraulic units shown as single-acting-gravity-return units and comprising the paired units 97 and 98 and the paired units 99 and 100.

Balancing paired units 97 and 98 is an auxiliary hydraulic control circuit 101 including the auxiliary hydraulic units 102 and 103 coupled to the movements of the hydraulic units 97 and 98 by suitable lever arrangements 104 and 105. The hydraulic circuit 101 is connected to operate the slide valve member 106 of valve 107 balanced by spring 108 and dash-pot 109 with the hydraulic units 97 and 98 in synchronism. A suitable displacement regulator for levelling or adjusting relationship of the hydraulic units illustrated at 110 is included in the control circuit 101. An identical arrangement is provided for balancing the paired hydraulic units 99 and 100 and like parts are identified by the same reference numerals referred to in the description of the balancing system synchronizing hydraulic units 97 and 98. Balancing the paired units 97, 98 and 99 and 100 is an auxiliary hydraulic control circuit 111 including control hydraulic units 112 and 113 connected to the paired main units by lever arrangements 114 and 115 respectively.

This auxiliary hydraulic control circuit 111 is arranged to control the operation of slide valve member 116 of valve 117 arranged to divide the hydraulic flow between the lines 118 and 119 connected with the valves 107. With the valve 120 in pressure line 121 open and valve 122, return line 123 closed, valve 117 is arranged to divide flow equally between the two lines 119 with the slide valve member 116 held in its position illustrated by the opposing and balancing forces of spring 124 and dash-pot 125. This balance position will be maintained as long as the paired units 97, 98 and 99 and 100 remain in synchronism. Upon the paired members moving out of synchronism however, the hydraulic balance in the auxiliary hydraulic circuit 111 will be upset in the same manner as described particularly in reference to the set-up of Figure 2, and the slide valve member 116 will be actuated in a direction to alter division of flow between the lines 119 to restore the paired units to their synchronized relation.

With valve 120 closed and valve 122 opened in the return line 123, the operation of the control set-up will be reversed to maintain the paired units in synchronism as their pistons descend by regulating the flow in the return lines 188.

Figure 5 shows a set-up similar to Figure 4 but showing the paired hydraulic units 126, 127 and 128 and 129 as of hydraulic units is identical, one only need be described double-acting. As the arrangement controlling both pairs for simplicity. Division of flow between the lines 130 and 131 leading to one end of the paired hydraulic units 126 and 127 is controlled by a valve 132, actuated by a slide valve member 133. This valve member or control in turn is actuated from a neutral position illustrated upon movement of the hydraulic units 126 and 127 out of synchronized or correlated relation by the unbalance created between bias 134 and dash-pot 135 under an unbalance being set-up in the displacement of the auxiliary or control hydraulic units 136 and 137 coupled to the paired main hydraulic units 126 and 127 by lever arrangements 138 and 139 respectively.

Division of flow between the balanced paired hydraulic units 126 and 127 and 128—129 is in turn controlled by a valve 140 having a slide valve member 141 actuated from the balanced position illustrated as balanced by spring 142 and dash-pot 143, by an unbalance in the auxiliary hydraulic control circuit 144. This latter circuit includes auxiliary or control hydraulic units 145 and 146 connected to the movement of the paired units 126, 127 and 128 and 129 by lever arrangements 147 and 148 respectively.

Again the action of the auxiliary circuit 144 is to actuate the slide valve member 141 in a direction to restore the paired hydraulic units to synchronism upon their moving out of correlated relation upsetting the hydraulic balance of the circuit 144.

A valve 149 is connected to regulate the direction of flow to and from the hydraulic units 126 to 129 and this valve includes a slide valve member 150 which in the position illustrated connects the central line 151 leading to valve 140 with the pressure line 152. Line 153 connected to the corresponding ends of all of the hydraulic units 126 to 129 is then connected to the return circuit 154. In this arrangement the valves 132 and 140 are dividing the input flow to the hydraulic units. With slide valve member 150 operated to connect line 153 to the pressure line 152 and line 155 to the return line 154, cutting off line 151 the valves 132 and 140 are connected to regulate the return flow from the hydraulic units and in this arrangement are equally as effective in maintaining them in synchronized or correlated relation.

For simplicity, the balancing units of the various auxiliary hydraulic control circuits have been omitted and throughout the description the controls regulating hydraulic flow to the main hydraulic units have been shown as slide valve members of a particular form and it will be understood that there may be any form of control employed, in carrying out the invention.

Further for sake of simplicity, the cylinders of the auxiliary hydraulic control units have been shown of similar diameters, but of course this relationship may be varied as desired as may also be the multiplying or dividing factor of the lever arrangements to provide different but correlated movements of the main hydraulic units as desired.

Such variations may of course be made without departing from the scope of the appended claims.

What I claim as my invention is:

1. Means for correlating the movement of two members at least one of which is hydraulically operated comprising a valve controlling movement of the hydraulically operated member, a closed auxiliary hydraulic control circuit comprising a hydraulic cylinder unit associated with each of said members and arranged to provide equal and opposite hydraulic displacement upon correlated movement of said members, a dash-pot connected in said control circuit and acting on said valve, means for balancing said closed hydraulic control circuit and spring bias means biasing said valve and dash-pot to a predetermined position with said control members in correlated position.

2. Means for correlating the movement of two members at least one of which is hydraulically operated comprising a valve controlling movement of the hydraulically operated member, a closed auxiliary hydraulic control circuit including a cylinder associated with each of said members, a piston operating in each of said cylinders, means connecting said pistons to the movement of said members to provide upon correlated movement of said members equal and opposite volume displacements in said cylinders, a dash-pot operating on said valve and connected in said hydraulic control circuit, variable chamber means connected in said closed hydraulic circuit for balancing same and spring means biasing said valve against the action of said dash-pot to hold said valve in a predetermined position under hydraulic conditions in said hydraulic control circuit with said members correlated and regulating operation of said valve under movement of said members out of correlated position disturbing hydraulic conditions in said hydraulic control circuit to restore said members to correlated relation.

3. Means for moving a hydraulically operated slave member in accordance with the movement of a master member, comprising in combination with a valve movable in opposite directions from an intermediate position to control movement of the slave member in opposite directions, a closed auxiliary hydraulic control circuit comprising a hydraulic cylinder unit associated with each of said members interconnected with a hydraulic dash-pot acting on said valve and disposed so that one cylinder empties into the other upon movement of said members, and bias spring means acting on said valve in opposition to said dash-pot, said hydraulic circuit being balanced with said bias means to maintain said valve in said intermediate position with said master and slave members in corresponding positions, said hydraulic cylinder units each comprising a hydraulic cylinder and a piston therefor connected to the movement of the master and slave members respectively to provide equal and opposite hydraulic displacement in said cylinders upon corresponding movement of said master and slave members, movement of said master member actuating said hydraulic dash-pot in accordance with the displacement of the piston connected thereto to operate said valve from said intermediate position in a direction to move said slave member and piston connected therewith to a position corresponding to the master member.

4. Means as claimed in claim 3 in which a pair of reservoir units are connected in said auxiliary hydraulic control circuit, each of said reservoir units comprising a cylinder having a piston operating therein, and means of lesser value than said bias device biasing the piston of one of said latter cylinders to discharge fluid into said circuit and means of greater value than said bias device biasing the piston of the other of said latter cylinders to discharge fluid into said circuit.

5. Means as claimed in claim 3 in which a balancing device comprising a variable chamber is connected in said auxiliary hydraulic circuit.

6. Means for correlating or synchronizing a pair of hydraulically operated devices comprising in combination with branch hydraulic circuits to said devices, and a valve controlling hydraulic flow to said branch circuits and having an intermediate position and positions on opposite sides of said intermediate positions for varying the division of flow to and from said branch circuits, an auxiliary hydraulic control circuit comprising a hydraulic dash-pot connected to operate said valve, bias means opposing said dash-pot and a hydraulic cylinder associated with each of said devices to be correlated connected to provide equal and opposite hydraulic displacement in said control circuit upon correlated movement of said devices, and altering the pressure in said dash-pot upon movement of said devices out of correlated relation.

7. Means for correlating or synchronizing a pair of hydraulically operated devices comprising in combination with branch hydraulic circuits to said devices, and a valve controlling hydraulic flow to said branch circuits and having an intermediate position and positions on opposite sides of said intermediate positions for varying the division of flow to and from said branch circuits, a hydraulic unit and a biasing device acting on said valve from opposite sides thereof, and means to balance said hydraulic circuit and biasing device to maintain said valve in said intermediate position upon said hydraulically operated devices maintaining synchronized or correlated relation, said latter means comprising a hydraulic cylinder associated with each hydraulically operated device and having a piston moved in accordance with the movement thereof, said cylinders being interconnected by an auxiliary hydraulic control circuit with each other and with said hydraulic unit acting on said valve and providing equal and opposite hydraulic displacement in said auxiliary control circuit maintaining constant pressure in said hydraulic unit upon said hydraulically operated devices maintaining synchronism or correlated relation, and, upon variation from correlated relation, said pistons providing a difference in hydraulic displacement altering pressure in said hydraulic unit to actuate said valve in a direction to restore said hydraulically operated devices to correlated relation.

8. Means as claimed in claim 7 in which said hydraulic cylinders associated with said hydraulically operated devices are of different diameters.

9. Means as claimed in claim 8, in which said pistons are connected through motion multiplying means with said hydraulically operated devices.

10. Means for correlating the movement of two hydraulically operated members connected in a circuit including a valve affording a variable division of hydraulic flow to and from said hydraulic members, said means comprising a biasing device acting on said valve to urge same in one direction, and a closed auxiliary hydraulic control circuit, including cylinders associated with each of said members and arranged one to fill and one to empty on movement of said members, and a dash-pot included in said closed circuit and acting on said valve in opposition to said biasing device, said closed circuit being balanced whereby on correlated movement of said members the quantum of hydraulic fluid displacement in said cylinders is equal and opposite, and the quantum of hydraulic fluid in said dash-pot is constant, and upon movement of said members out of correlated movement, the quantum of hydraulic fluid in said dash-pot is altered to effect valve movement in a direction to restore correlated movement of said members.

References Cited in the file of this patent

UNITED STATES PATENTS

| | | |
|---|---|---|
| 752,491 | Warren | Feb. 16, 1904 |
| 2,607,196 | May | Aug. 19, 1952 |
| 2,637,303 | Cintron | May 5, 1953 |